United States Patent [19]

Skotheim

[11] Patent Number: 4,488,943
[45] Date of Patent: Dec. 18, 1984

[54] POLYMER BLENDS FOR USE IN PHOTOELECTROCHEMICAL CELLS FOR CONVERSION OF SOLAR ENERGY TO ELECTRICITY AND METHODS FOR MANUFACTURING SUCH BLENDS

[75] Inventor: Terje Skotheim, East Patchogue, N.Y.

[73] Assignee: The United States of America as represented by the United States Department of Energy, Washington, D.C.

[21] Appl. No.: 448,115

[22] Filed: Dec. 9, 1982

Related U.S. Application Data

[63] Continuation-in-part of Ser. No. 386,666, Jun. 9, 1982, Pat. No. 4,442,185, which is a continuation-in-part of Ser. No. 312,888, Oct. 19, 1981, Pat. No. 4,416,959, which is a continuation-in-part of Ser. No. 208,059, Nov. 18, 1980, Pat. No. 4,352,868.

[51] Int. Cl.$^3$ .............................................. C25D 9/02
[52] U.S. Cl. ..................................... 204/58.5; 204/29; 204/30; 204/56 R; 204/78; 204/181 E; 429/111
[58] Field of Search ................... 204/181 E, 56 R, 78, 204/29, 14 N, 30; 429/111

[56] References Cited

U.S. PATENT DOCUMENTS 4,334,054  6/1982  Dubois et al. ...................... 204/58.5
4,427,513  1/1984  Skotheim et al. ............... 204/181 E Primary Examiner—R. L. Andrews
Attorney, Agent, or Firm—Margaret C. Bogosian; Jeannette M. Walder

[57] ABSTRACT

There is disclosed a polymer blend of a highly conductive polymer and a solid polymer electrolyte that is designed to achieve better charge transfer across the conductive film/polymer electrolyte interface of the electrochemical photovoltaic cell. The highly conductive polymer is preferably polypyrrole or poly-N-p-nitrophenylpyrrole and the solid polymer electrolyte is preferably polyethylene oxide or polypropylene oxide.

18 Claims, No Drawings

POLYMER BLENDS FOR USE IN PHOTOELECTROCHEMICAL CELLS FOR CONVERSION OF SOLAR ENERGY TO ELECTRICITY AND METHODS FOR MANUFACTURING SUCH BLENDS

BACKGROUND OF THE INVENTION

The U.S. Government has rights in this invention pursuant to Contract No.DE-AC02-76CH00016, between the U.S. Department of Energy and Associated Universities, Inc.

CROSS-REFERENCE TO RELATED APPLICATIONS

This application is a continuation-in-part of patent application Ser. No. 386,666, filed June 9, 1982, now U.S. Pat. No. 4,442,185, which is a continuation-in-part of application Ser. No. 312,888, filed Oct. 19, 1981, now U.S. Pat. No. 4,416,959, which is a continuation-in-part of application Ser. No. 208,059, filed Nov. 18, 1980, and issued as U.S. Pat. No. 4,352,868, on Oct. 5, 1982.

FIELD OF THE INVENTION

This invention relates generally to electric cells and methods of their manufacture, and more particularly to such cells employing dry, solid thin film polymer electrolytes and methods of their manufacture, as well as polymer films for use in such cells.

DESCRIPTION OF THE PRIOR ART

Photovoltage or the photovoltaic effect may be defined as the conversion of light or electromagnetic photons to electrical energy by a material. Becquerel in 1839 was the first to discover that a photovoltage developed when light was shining on an electrode in an electrolyte solution. Nearly half a century elapsed before this effect was observed in a solid, namely in selenium. Again, many years passed before successful devices such as the photoelectric exposure meter, were developed. Radiation is absorbed in the neighborhood of a potential barrier, usually a pn junction or a metal-semiconductor contact or junction, giving rise to separate electron hole pairs which create a potential.

Photovoltaic cells have found numerous applications in electronics and aerospace, notably in satellites for instrument power, and powering communications apparatus in remote locations.

Intensive research is underway in the last decade to improve the production of these cells, e.g., (1) increasing the practical efficiency in order to approach the theoretical efficiency, (2) decreasing production costs, and (3) to find new materials and combinations.

Intensive interest in alternative energy sources and particularly in solar energy has increased because of political and economic impetus. Traditional sources of inexpensive energy are rapidly disappearing. Political instability, price/supply fixing by certain governments, and environmental concerns, dictate the search for new energy sources. Thus, the present interest in solar energy. Each country has its own sunlight supply, and the United States has an ample supply. Ecologically, solar cells are a non-polluting clean source of energy. Solar energy in our foreseeable future and for many generations is limitless and non-depletable. One application of solar energy to which the present invention is directed is the direct conversion of electromagnetic radiation, particularly sunlight, to electricity.

Two of the classical goals of any photovoltaic cell are efficiency, and higher output voltage. Most prior cells have a theoretical efficiency of 25%. The cells of the present application approach 35%. The prior art voltage ranges from 0.2 to 0.5 volts per cell; the voltage of the cells of the present invention is approximately 0.625 volts.

Further, some prior art cells require that they be oriented so that the incident light is perpendicular to the face of the cell. In the present invention, while this is desirable, it is not essential, and they may operate at an angle from the perpendicular.

In the parent applications of which this forms a Continuation-In-Part, there is described in one embodiment a photovoltaic cell having a semiconductor layer and an adjacent polymer electrolyte. To improve the electrical properties at the interface, there is included a conductive film between the semiconductor and the adjacent solid polymer electrolyte. One of the objects of the present invention is to produce a polymer blend of a highly conductive polymer and a solid polymer electrolyte in order to achieve better charge transfer across the conductive film/polymer electrolyte interface of the electrochemical photovoltaic cells disclosed in the parent applications.

In the parent applications, there is described a photovoltaic cell in which there is a thin film solid polymer electrolyte with a semiconductor adjacent thereto, and a conductive film between the solid polymer electrolyte and the adjacent semiconductor. The polymer phases are in the form of thin films, usually between 0.01 and 1.0 micrometers and are essentially transparent. The highly conductive polymer is synthesized directly on the surface of the semiconductor by a technique of photoassisted electrochemical oxidation from a solution of the monomer in a supporting electrolyte.

A further object of the present invention is to provide a film of a polymer blend of a highly conductive polymer and a solid polymer electrolyte which can be used for such photovoltaic cells. This is accomplished by having the polymerization described above take place from a solution which in addition includes the polymer electrolyte in its complexed form. The polymerization of the highly conductive polymer performed with the complexed polymer electrolyte present produces a polymer blend of the two polymer phases. This results in increased interfacial contact area and improved charge transfer characteristics.

These and other objects of the invention will be more fully understood from the description of the embodiments which follow, but it should be understood that the invention is not limited to these embodiments and may find application as would be obvious to a person skilled in the art following the teachings of this application.

SUMMARY OF THE INVENTION

In the parent applications, there is provided a device having a first layer of semiconductive material having a first band gap; and a second layer of material having a different band gap; a layer of dry solid polymer electrolyte between said first and second layers; and a layer of polymer blend of a highly conductive polymer and a solid polymer electrolyte between said dry solid polymer electrolyte and said semiconductor layer.

In said applications there is also provided a thin film which contributes improved electric charge transfer across said film. This film is comprised of a polymer blend of a highly conductive polymer and a solid polymer electrolyte, said blend being the major component of said film at one face thereof, and a dry solid polymer electrolyte being the major component of said film at another face thereof. Said blend of said conductive and electrolyte polymer being more conductive than said dry solid polymer electrolyte.

The parent applications describe in at least one embodiment photovoltaic cells having a dry solid polymer electrolyte and adjacent semiconductor layer. In this embodiment in the parent applications there is described, in one aspect, an improved contact between said solid polymer electrolyte and the semiconductor. This improved contact uses a polymer blend of a highly conductive polymer, preferably polypyrrole, and a solid polymer electrolyte, preferably polyethylene oxide complexed with potassium iodide. Other highly conductive polymers that may also be used in preparing the polymer blend include polyindole, polyazulene, polythiophene, and polyfuran. Other solid polymer electrolytes suitable for this application include polypropylene oxide. The solid polymer electrolyte may also be complexed with sodium iodide. This blend leads to an increase in the interfacial contact area and an improved charge transfer characteristic between the electrolyte and the semiconductor.

It will be appreciated that there may be additional intermediate layers of conductors such as platinum between the semiconductor and the blend. The semiconductor may be coated with a thin layer of platinum, usually from about 5.0 to 50.0 Angstroms; this may be done with vacuum evaporation or electrolytical deposition. The platinum layer produces a better electronic and physical coupling between the semiconductor and the polymer, and, therefore, produces better charge transfer.

DESCRIPTION OF THE PREFERRED EMBODIMENTS

The production of the polymer blend of the highly conductive polymer and the solid polymer electrolyte through polymerization of the polymer electrolyte in its complexed form can be carried out by several different approaches.

The polymer electrolyte is an electron and/or ion-exchange polymer, for example, a polymer matrix containing a redox reduction-oxidation couple. The polymer matrix is a polyalkene oxide. Suitable polyalkene oxides include polyethylene oxide, polyethylene glycol, polypropylene oxide, or polypropylene glycol; all form suitable polymer matrixes, with polyethylene oxide being preferred. The redox couple is a polysulfide, e.g. $Na_2S_4$. The concentration of $Na_2S_4$ in the electrolyte may be defined as a weight ratio, 0.25 grams of $Na_2S_4$ for each gram of polyethylene oxide, or as the ratio of oxygen atoms in the chain to the metal cation, in which case the $O/Na^+$ ratio was 8.

The polymer electrolyte film can be made on the cadmium sulfide semiconductor by evaporation from a methanol solution, i.e. polyethylene oxide with a methanol solvent. The thickness of one polymer film is about 10 micrometers. Contact with the cadmium telluride semiconductor is by contact and heating under vacuum with a pressure of 1 kg/cm$^2$.

One advantage of the present invention is the ability to make the electrochemical photovoltaic cells all thin film, (e.g. the thickness can be a few micrometers or less). Single crystals may be used as well as amorphous or polycrystalline materials. The thickness of the semiconductor material depends on (a) the absorptivity of the material (how thick to absorb all the light of energy above the band gap), and (b) the diffusion length (if light is absorbed on the opposite side of the junction as in the CdS in the example, the charges will have to diffuse to the junction region on the other side in order to be collected). For silicon for example, this means a thickness of about 100 micrometers, and for GaAs or CdS, about 2–3 micrometers.

The polymer film will be less than 1 micrometer, (even less than 0.1 micrometer) depending on its resistivity and deformability.

Many redox couples can be used, e.g. $I^-_3/I^-$, $TCNQ^-/TCNQ$. These redox species with a single charge can be transported as ions through the polymer. Ions with multiple charge may interact too strongly with the matrix to have ionic mobility but at high concentrations may provide electronic conductivity by hopping or tunneling between the molecules. In this case applicable multiple charged redox species include $Fe^{2+}/Fe^{3+}$, $Fe(CN)^{3-}_6/Fe(CN)^{4-}_6$, Quinone $(Q/QH_2)$, and others.

Specific polymers that are useful in the present invention have been discussed above. These can generally be grouped into several categories.

(i) For solution produced films, insulating polymers with high dielectric constants and, therefore, high solubility for ions are applicable for the production process described. Polymers with sulfonic groups are good, i.e. sulfonic polymers.

(ii) Electronically conductive polymer films with ions dissolved in the polymers, e.g. polyacetylene. The combination of electronic and ionic conductivity impart higher mobility to the ionic species in order to preserve space charge neutrality in the film.

(iii) Polyphenylene oxide incorporating ferrocene. These films are produced by electrochemical oxidation on metal surfaces. They may be produced in the tranparent counter electrode. Then the semiconductor material is placed on top of the polymer, n- or p-type. Alternatively, the doped polymer may be produced directly on the surface of an n-type material by the process of photo-electro-oxidation by illuminating with light with energy higher than the band gap of the semiconductor. An anodic (positive) polarization is applied to the semiconductor in order to drive the minority carriers (holes) to the semiconductor/electrolyte interface to perform the oxidation of the monomer in solution to polymer, which deposits onto the semiconductor surface. The polymer itself is insulating. Molecules can be incorporated into the polymer matrix from the same solution. The resulting polymer film is uniformly doped with molecules or ions and, therefore, forms a rectifying barrier with a semiconductor. This process is applicable to other insulating polymer matrices than polyphenylene oxide and to other dopants than ferrocene. An example of this process for a different type of polymer is the electronically highly conductive polymer of polypyrrole.

An equivalent process is photo-electroreduction on the surface of p-type semiconductors. The absorbed light of energy larger than the band gap of the semiconductor produces electron-hole pairs, Cathodic(negative) polarization on the semiconductor makes the minority carriers (electrons) flow to the semiconductor/electrolyte interface and can be used to reduce monomers in solution to polymers on the surface incorporating dopant molecules or ions from the solution. The process is thus a one-step oxidation or reduction and doping. An example of this process is the electrochemical reduction of acrylonitrile to polyacrylonitrile.

The polymers which can be photoelectropolymerized on n-type semiconductors in the manner described above can be polymerized on p-type semiconductors as well by anodic polarization without light. Similarly, the polymers which can be photoreduced on p-type semiconductors can be reduced directly by a negative voltage on the surfaces of n-type semiconductors.

(iv) Polymers with pendant groups attached to the backbone of insulating polymers, e.g. TTF substituted polystyrene copolymer. The energy levels which interact with the semiconductor to produce a junction are defined by the pendant molecules which, in high concentrations, produce electronic conductivity by hopping or tunneling. These energy levels can be adjusted by substituting different pendant groups.

Various polymer production techniques may be used in producing the polymer films used in the electrochemical photovoltaic cells. Such techniques include: (i) solvent evaporation: spin-coating is used to produce thin uniform films. This has been used with pendant group polymers and with polyethylene oxide; (ii) glow discharge polymerization; (iii) oligomerization during surface chemical reaction; (iv) irreversible adsorption of polymer films; (v) plasma polymerization; (vi) electrodeposition; and (vii) functionalization of surface bound polymers.

Several techniques may be combined either at the same junction or at successive junctions. Polyethylene oxide, for example, is soft and a very thin coating may not have the rigidity required for assembly. A very thin layer of a more highly conductive polymer is photoelectropolymerized on a face of one or both of the semiconductors and a soft material e.g. polyethylene oxide is between the two.

Techniques for producing semiconductor thin films include techniques for making the semiconductor film directly on top of the polymer film, which has been made on a transparent electrode or the opposite semiconductor. These techniques include: (i) spray pyrolysis (solution spraying), which requires substrates held at elevated temperatures, sometimes up to 400° C., and requires polymers which can withstand such high temperatures; (ii) silk screening (seriography); (iii) deposition from aqueous solution where ions precipitate as the semiconductor film on top of the substrate. This technique can be used for a number of compounds, e.g. CdS, CdO, ZnO, and is not a high temperature process; (iv) cathodic codeposition of different elements using the polymer coated electrode as cathode. This can be used for CdS (without polymers on the electrodes). It involves an aqueous solution and is, therefore, not a high temperature process; (v) anodic formation of semiconducting films by using the polymer coated electrode as anode in an aqueous solution. This can be used for CdS and $Bi_2S_3$ and is not a high temperature process.

An example can be given of the formation of a thin layer of the highly conductive polypyrrole on the surface of the semiconductor, e.g. n-type silicon. The method is applicable to other combinations of polypyrrole and polymers on semiconductor materials.

Pyrrole can be polymerized onto the surface of metal electrodes and doped to a conductive form by a one-step electrolytic oxidation of pyrrole (usually 0.01-5.0 Molar) in acetonitrile solution using a tetraethylammonium tetrafluoroborate electrolyte (usually 0.01-1.0 Molar). Dark electrolytic oxidation on an n-type semiconductor is impossible because the oxidation potential of pyrrole lies at a higher positive potential than the flat band potential or the conduction band edge of the known semiconductors. The oxidation of pyrrole to polypyrrole on an n-type semiconductor surface is carried out by illuminating the semiconductor with light of an energy higher than the band gap and applying a small anodic bias. The minority carriers generated by the light absorption migrate to the semiconductor-electrolyte interface where they oxidize the pyrrole which in turn deposits onto the surface as polypyrrole. The polymer is uniformly doped by anions from the electrolyte to a highly conductive form or a p-type semiconductor depending on the solution concentration of the dopant. It is produced on single crystal, polycrystalline, or amorphous semiconductors.

One preferred method of manufacturing highly conductive and transparent polymer films employs the photoelectrochemical generation of thin conductive polymer films (e.g. polypyrrole) on an n-type semiconductor (e.g. n—Si) using light absorbed by the semiconductor.

A semiconductor is immersed in a solution which contains the monomer (the building blocks of the polymer chain) and a supporting electrolyte which contains the species to be used as dopant for the polymer. The light is absorbed by the semiconductor, and generates electron-hole pairs ($h^+$, $e^+$). A positive potential from a source on the semiconductor drives the holes to the semiconductor-electrolyte interface. The hole reaching the interface takes an electron from (oxidizes) a monomer in the solution. A polymer film will then grow by this electro-oxidation process on the surface of the substrate. Electro-oxidation has been known on metal surfaces (where light is not needed) for a number of different polymers; the process is used for: polypyrrole; polyaniline; substituted anilines such as p-toluidine, p-anisidine, 2-aminobenzotrifluoride, 3-aminobenzotrifluoride, p-aminobenzoic acid, p-phenylenediamine and o-phenylenediamine; polyphenylene oxide; poly(2,5-thienylene); poly(p-phenylene); poly(p-phenylene sulfide); polydibenzothiophene sulfide; and polyhydroxyphenylene on the semiconductor.

The monomer concentration (e.g. pyrrole) is typically 0.01 Molar to 1.0M, the supporting electrolyte contains the ions to be used as dopants (e.g. $BF^-_4$, $ClO^-_4$, $I^-$, $Cl^-$) typically in concentrations 0.01-1.0M. The dopant molecules (e.g. $BF^-_4$) will be included in the film as it is being made. The dopants will be acceptors of electrons.

The doping may also be done from the gas phase of the dopant. It may also be done electrochemically after the film is made.

The solvent is an organic solvent (e.g. acetonitrile, dimethylformamide, dimethylsulfoxide, propylene carbonate, methanol) or water. It may also be a mixture (e.g. acetonitrile+pyridine).

The doping and the manufacturing of the polymer films may thus be a one-step process. The polymer films will continue to grow only as long as the light is on and the film is not yet thick enough to absorb all the incident light. Thick films become black and non-transparent because they are highly conductive.

A negative potential on an illuminated p-type electrode drives the photogenerated electrons to the interface where they reduce (add an electron to) a monomer species in solution which then builds a polymer film on the surface of the semiconductor. The dopant in this case will be an electron donor (e.g. Na, K).

Certain polymer films can be made by condensation from the gas phase. Other polymer films can be made by gas phase ionization or plasma polymerization by an electric discharge in a gas of the monomer.

The thin transparent metal films that can be applied to the semiconductors can be made in several ways. If the semiconductor surface is modified by a metal film, the film can be made by deposition in vacuum (thermal evaporation or sputtering) or electrolytically from a solution containing ions of the metal to be deposited. The thickness of the metal film can be from 2-3 Angstrom to 150 Angstrom. The metals traditionally used have been Pt, Pd, Au, Mg, Cr, Al, Cs, Cr—Cu alloys, indium-tin oxide, tin oxide.

The polymer electrolyte used is an electron or ion exchange polymer, e.g., a polymer matrix containing a redox reduction-oxidation couple, and may be selected from the following groups of material:

1. Polyethers: polyethylene oxide and polypropylene oxide.

The films are cast from solutions containing dissolved redox couples; iodine ($I^-_3/I^-$), bromine ($Br^-_3/Br^-$), tetracyanoquinodimethane ($TCNQ^-/TCNQ$), and polysulfides (e.g. $Na_2S_4$) are good candidates for ion exchange couples.

2. Polyurethanes made from polyethylene glycol and polypropylene glycol.
3. Polyacetylene.
4. Polyhydroxyphenylene.
5. Polymers with electroactive groups attached to the polymer backbone, e.g. phenoxytetrathiafulvalene.
6. Polysulfone.
7. Cellulose acetate.

In a particularly preferred embodiment of the present invention, the highly conductive area is a polymer blend of a highly conductive polymer, e.g. polypyrrole and a solid polymer electrolyte, e.g. polyethylene oxide (PEO) complexed with potassium iodide. In the blend, the polymer electrolyte component penetrates into the conductive polymer component resulting in increased contact area, and thus better charge transfer across the interface. The film of dry solid polymer electrolyte is, for example, several hundred to 10,000 angstroms thick; and the highly conductive layer 100 to 1000 angstroms thick. Both layers are essentially transparent.

The highly conductive polymer blend is synthesized directly on the surface of the semiconductor by a technique of photoassisted electrochemical oxidation from a solution of the monomer of the highly conductive polymer and the polymer electrolyte in its complexed form. The resulting polymerization of the highly conductive polymer, e.g. with the complexed polymer electrolyte present in solution produces a polymer blend of the two polymer phases.

A method of manufacturing the basic cell is as follows with the improved blend. The semiconductor may be coated with a thin layer of platinum, e.g. 5-50 angstroms. This is particularly desirable where the n-silicon is single crystal. The platinum layer may be done e.g. by vacuum evaporation or electrolytic deposition. If the semiconductor is p-type silicone, a low electronegative metal, such as aluminum may be used.

A solution is formed containing (1) acetonitrile as solvent, (ii) tetraethylammonium tetrafluoroborate, (e.g. 0.01-1.0 Molar), (iii) Pyrrole (0.01-5.0 Molar), (iv) 0.01-3.0% PEO by weight; molecular weight of PEO may be $10^4$–$5 \times 10^6$; (v) KI in a ratio of 4.5-8 polyether oxygen atoms per potassium atom, and (vi) $I_2$ in a ratio of $KI:I_2=4:1$. The semiconductor, with or without the metal layer, is immersed into the solution and the semiconductor is held at 0.5 volts or higher potential, versus the standard calomel reference electrode.

The right hand of the completed cell may be another p-type semiconductor, or glass with a transparent conductive coating, or other material as discussed in the parent applications.

Once the semiconductor layer has been formed with the polymer blend, and the right hand member prepared (whether bare, or with a layer of metal and/or a layer of polymer blend on the face thereof); the next step is to form the dry solid polymer electrolyte. A film of polyethylene oxide complexed with, (or doped with), potassium iodide and iodine in solution is cast by solvent evaporation from acetonitrile solution, for example, by spin coating. The thickness when dry is in the range of 0.01 to 1.0 microns. The polymer electrolyte may be formed on the polymer blend film, or on the surface (bare or prepared) of the right hand member or on both. The two halves of the electrochemical photovoltaic cell are then contacted to each other by heating to 70°–100° C. under vacuum with pressure about 1 kg/cm² for ten minutes to ten hours.

Thus, it will be appreciated that the dry solid polymer electrolyte is adjacent to the polymer blend (which is a composite of dry solid polymer electrolyte with the highly conductive polymer). During the step of forming the polymer blend, there is electrochemical polymerization of polypyrrole in a solution containing PEO-KI/$I_2$. Polyethylene oxide is a polymer soluble in acetonitrile. As the polypyrrole film grows, it entraps the PEO-KI/$I_2$ phase within it, resulting in a polymer blend of polypyrrole and PEO-KI/$I_2$.

A modification of the method just described may be achieved by using a different complexing salt for PEO. This modification avoids two competing paths for the current flow:

(i) polymerization of pyrrole (2.2-2.4 electrons per pyrrole monomer;
(ii) oxidation of the iodide in the electrolyte solution, i.e.
  $2h^+ +3I^- ---- I^-_3$ at the semiconductor surface
  $2e^- +I_3^- ---- 3I^-$ at the counter electrode, where
  $h^+$ designates a hole and $e^-$ designates an electron.

Reaction (ii) is a parasitic reaction which lowers the yield of the polymerization. This yield may be improved as follows:

(a) Polymerize from a solution of acetonitrile as solvent, tetraethylammonium tetrafluoroborate, pyrrole, and PEO, KI and $I_2$ as described above, but in this modification the PEO is complexed with $KNO_3$. Alternatives are $NaNO_3$, KCl, NaCl, $NClO_4$, $NaClO_4$, $NaBF_4$, $KBF_4$. $NO^-3$ and the other anions are not electroactive at the potentials in question and should not, therefore, contribute a parasitic current.

(b) Upon contacting the polymer blend of polypyrrole and PEO with a film of PEO-KI/$I_2$ an electrochemical exchange of anions will automatically take place giving a polymer blend of polypyrrole and PEOKI- /I$_2$, i.e. the NO$_3$ will diffuse out of the blend and the iodide will diffuse in.

In a further preferred embodiment of the present invention, a procedure is described for making a composite of polypyrrole and complexed polyethylene oxide which results in substantial amounts of PEO in the polypyrrole matrix. This aspect of the present invention produces the desired composite using a different approach, that is treating the PEO complex as a counter ion and thus drawing it into the polypyrrole matrix electrically. This is accomplished by modifying the pyrrole monomer prior to the electrosynthesis of polypyrrole. The pyrrole monomer is modified by attaching nitrophenyl groups to the N-position of the pyrrole to form N-p-nitrophenylpyrrole. The N-substituted pyrrole is subsequently polymerized electrochemically to form poly-N-p-nitrophenylpyrrole on the surface of the n-type semiconductor. This polymer film is then reduced to an anionic polymer with negative charges associated with the nitro groups. Since the reduction takes place in an electrolyte which contains complexed polyethylene oxide, e.g. PEO—Na$^+$, the positive PEO complex will be drawn into the polypyrrole film as a counterion to provide charge neutrality.

The above description and examples are set forth by way of example and illustration in order to enable those skilled in the art to practice the present invention. The present invention is defined, and its limitations set forth only in the following claims.

I claim:

1. A method for producing a thin film polymer blend of a highly conductive polymer and a solid polymer electrolyte comprising the steps of:
   (a) preparing a substrate for receiving said film;
   (b) preparing a solution of a monomer of said highly conductive polymer and a complex of said solid polymer electrolyte;
   (c) immersing said substrate into said solution and by electrochemical or photoelectrochemical methods forming said polymer blend film on said substrate.

2. A method according to claim 1, wherein said monomer is pyrrole and said highly conductive polymer which is formed as part of the thin film polymer blend is polypyrrole.

3. A method according to claim 1, wherein said monomer is N-p-nitrophenylpyrrole and said highly conductive polymer which is formed as part of the thin film polymer blend is poly-N-p-nitrophenylpyrrole.

4. A method according to claim 1, wherein the solvent used is selected from the group consisting of acetonitrile, ethanol, methanol, and tetrahydrofuran.

5. A method according to claim 1, wherein said highly conductive polymer is doped by adding to the solution tetraethylammonium tetrafluoroborate or tetraethylammonium perchlorate.

6. A method according to claim 1, wherein said monomer which forms said highly conductive polymer is selected from the group consisting of indole, which forms polyindole when polymerized; azulene, which forms polyazulene when polymerized; thiophene, which forms polythiophene when polymerized; and furan, which forms polyfuran when polymerized.

7. A method according to claim 1, wherein said solid polymer electrolyte is selected from the group consisting polyethylene oxide and polypropylene oxide.

8. A method according to claim 7, wherein said solid polymer electrolyte is complexed with potassium iodide or sodium iodide.

9. A method according to claim 1, wherein said substrate is a semiconductor or a semiconductor coated with a transparent metallic layer.

10. A method according to claim 9, wherein the metal used to form the transparent metallic layer on the semiconductor is platinum.

11. A method of forming a polymer blend film having improved electric charge transfer characteristics, comprising the steps of:
   (a) forming a solution of
      (i) acetonitrile as solvent
      (ii) tetraethylammonium tetrafluoroborate (0.01-1.0 Molar)
      (iii) pyrrole (0.01-5.0 Molar)
      (iv) 0.01-3.0% polyethylene oxide by weight; molecular weight of polyethylene oxide may be $10^4 - 5 \times 10^6$
      (v) potassium iodide in a ratio of 4.5-8 polyether oxygen atoms per potassium atom
      (vi) I$_2$ in a ratio of KI:I$_2$=4:1
   (b) immersing a substrate in said solution; and
   (c) applying a polymerization potential of at least 0.5 volts if the substrate used is metallic; or applying a polymerization potential of at least 0.5 volts while applying light of sufficient intensity to cause said pyrrole monomer to polymerize if the substrate used is an n-type semiconductor.

12. A method of forming a polymer blend film having improved electric charge transfer characteristics, comprising the steps of:
   (a) forming a solution of
      (i) acetonitrile as solvent
      (ii) tetraethylammonium tetrafluoroborate (0.01-1.0 Molar)
      (iii) pyrrole (0.01-5.0 Molar)
      (iv) 0.01-3.0% polyethylene oxide by weight; molecular weight of polyethylene oxide may be $10^4 - 5 \times 10^6$
      (v) potassium nitrate as complexing agent
      (vi) potassium iodide in a ratio of 4.5-8 polyether oxygen atoms per potassium atom
      (vii) I$_2$ in a ratio of KI:I$_2$=4:1
   (b) immersing a substrate in said solution; and
   (c) applying a polymerization potential of at least 0.5 volts if the substrate used is metallic; or applying a polymerization potential of at least 0.5 volts while applying light of sufficient intensity to cause said pyrrole monomer to polymerize if the substrate used is an n-type semiconductor.

13. A method according to claim 11, wherein N-p-nitrophenylpyrrole is used as the monomer in place of pyrrole.

14. A method according to claim 1, wherein said substrate is a glass substrate.

15. A method according to claim 1, wherein said substrate is selected from the group comprising a coating of platinum on another substrate; a coating of chromium on another substrate; or a coating of indium-tin oxide on another substrate.

16. A method according to claim 1, wherein the substrate employed is a metallic substrate and the polymerization is accomplished by electrochemical methods.

17. A method according to claim 1, wherein the substrate employed is an n-type semiconductor and the polymerization is accomplished by photoelectrochemical methods.

18. A method according to claim 12, wherein N-p-nitrophenylpyrrole is used as the monomer in place of pyrrole.

* * * * *